United States Patent [19]

Morrow, Sr. et al.

[11] 3,989,325

[45] Nov. 2, 1976

[54] ROTATABLE BED AND ROLLER ASSEMBLY

[75] Inventors: James G. Morrow, Sr.; David J. Pech; Terry W. Kleppe, all of Manitowoc, Wis.

[73] Assignee: The Manitowoc Company, Inc., Manitowoc, Wis.

[22] Filed: Apr. 24, 1975

[21] Appl. No.: 571,301

[52] U.S. Cl. .................................. 308/204; 212/69; 308/207 R

[51] Int. Cl.$^2$ .......................................... F16C 13/00

[58] Field of Search ............................ 308/204, 126; 212/66–69, 70, 28; 214/132–138; 180/79.4; 280/106

[56] References Cited

UNITED STATES PATENTS 2,513,726 7/1950 Huston ................................. 212/69

3,131,818 5/1964 Allin, Jr. ............................... 212/69

*Primary Examiner*—Robert G. Sheridan
*Assistant Examiner*—Lawrence J. Oresky
*Attorney, Agent, or Firm*—Leydig, Voit, Osann, Mayer & Holt, Ltd.

[57] ABSTRACT

A rotatable bed for a load handling device including yoke-shaped side frames each having an integral jaw member depending therefrom to which is detachably connected an arcuate beam carrying a plurality of hook rollers adapted to roll on the underside of a roller path on the device. Each end of the arcuate beam is slidably carried on link spanning one of the jaws and is adjustable thereon.

5 Claims, 9 Drawing Figures

10
12
13
14
15
16
17
18
19
20
21
22
23
24
25
28
30
31
32
33
34
35
36
37
38
39
40
45
50
53
60

ROTATABLE BED AND ROLLER ASSEMBLY

BACKGROUND OF THE INVENTION

This invention relates to load handling devices and more particularly concerns a rotatable bed and roller assembly for such devices.

Load handling devices such as lift cranes and the like are commonly provided with a rotatable bed on which the upper works of the crane including the boom and hoist drums are located. In large, heavy-duty lift cranes a counterweight of considerable mass is carried on the rear end of the rotatable bed opposite the boom. It is, of course, necessary for the rotatable bed to support not only the counterweight but also the pay load being lifted by the crane. In addition to the load supporting rollers, the rotatable bed must also be provided with hook rollers to counteract the tipping moment imparted to the rotatable bed by the payload during lifting and by the counterweight at other times.

It is the primary aim of the present invention to provide an improved heavy-duty rotatable bed and roller assembly for a lift crane or the like.

A more detailed object is to provide a novel hook roller assembly which permits adjustment and removal of a plurality of hook rollers as a unit.

It is also an object of the invention to provide a front roller assembly wherein the front load bearing rollers and the front hook rollers are mounted on a common sub-frame secured to the rotatable bed of a lift crane or the like.

Other objects and advantages of the invention will become apparent upon reading the following detailed description and upon reference to the drawings, in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
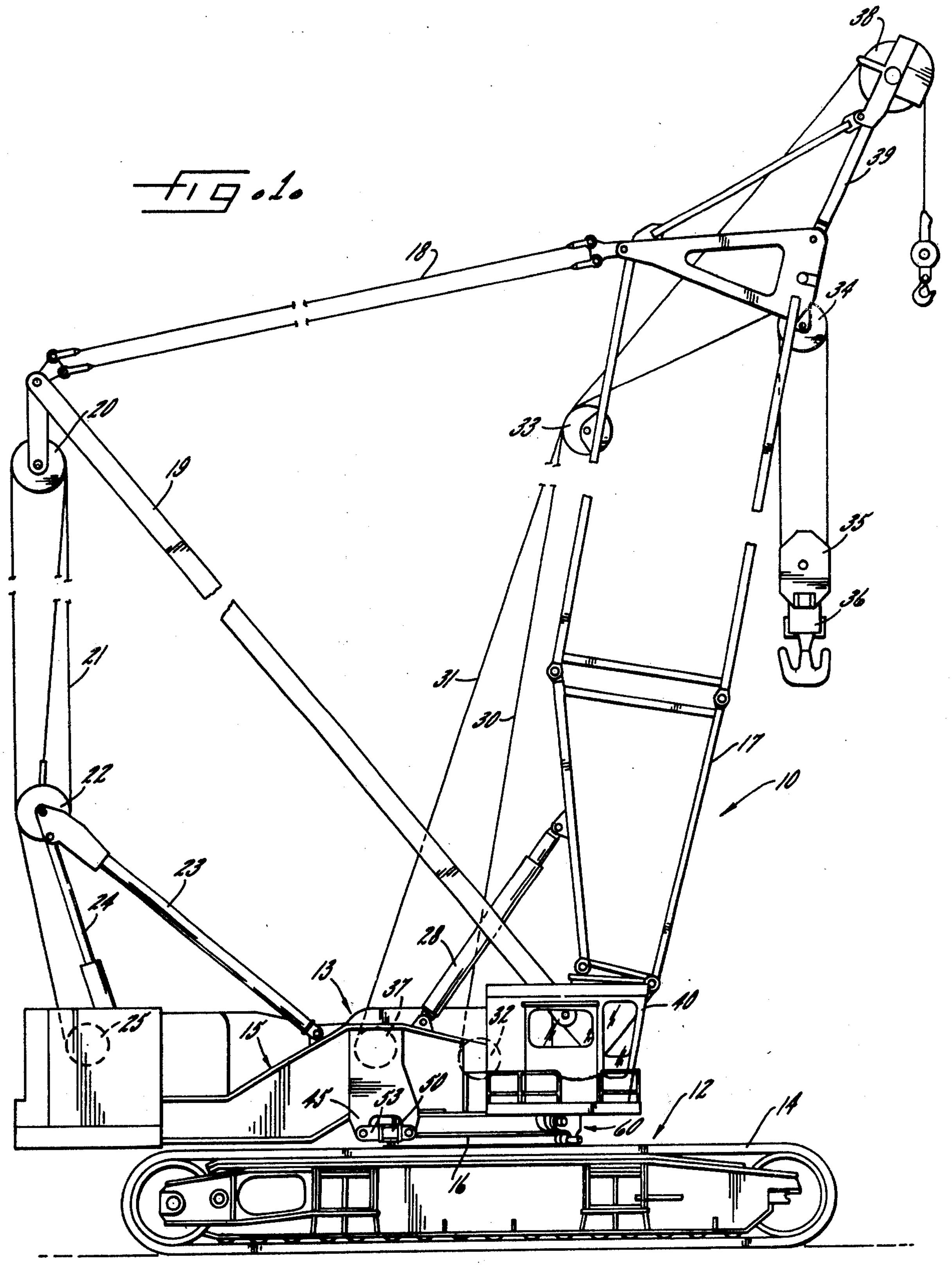
FIG. 1 is a fragmentary side elevation, somewhat schematic, of a load handling device in the form of a lift crane embodying the rotational bed and roller assembly of the invention.
Figure 2:
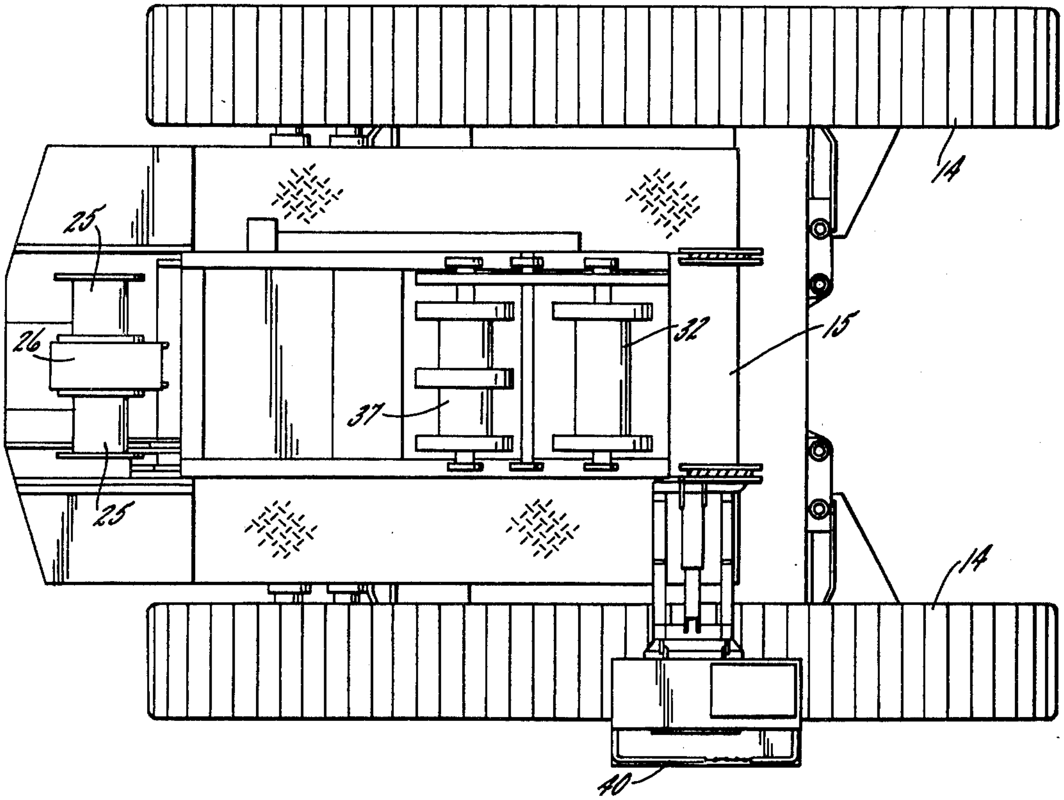
FIGS. 2 and 3 are plan and front elevation views, respectively, of the lower works of the crane shown in FIG. 1.
Figure 3:
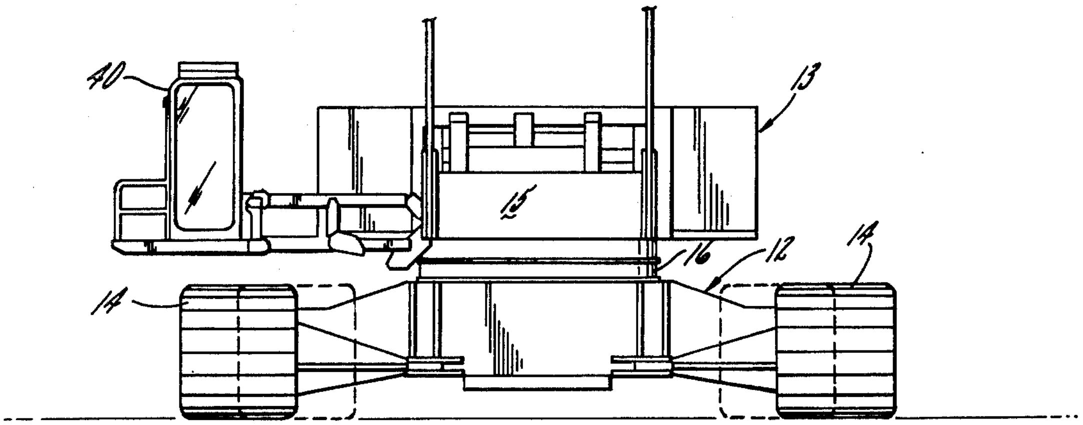

Turning now to the drawings, there is shown in FIG. 1 a load handling device in the form of a crane assembly 10 with which the present invention is associated. The crane assembly 10 includes lower works 12 and upper works 13. In the illustrated embodiment, the lower works 12 is supported by a pair of traction assemblies 14, but it should be understood that it could be wheel supported or even stationary insofar as the present invention is concerned. For further details of a preferred form of crane lower works, reference may be made to copending application Ser. No. 571,303, filed Apr. 24, 1975 for Demountable Self-Propelled Crane Transport Assembly, which is assigned to the same assignee as the present application.

The upper works 13 of the crane assembly 10 includes a rotatable bed 15 supported by front and rear roller assemblies (to be described below) which engage a ring gear and roller path 16 on the lower works 12.

The rotatable bed carries a pivotally mounted boom 17 supported by two pairs of laterally spaced pendants 18 (only one pair of which is shown) extending rearwardly to the upper ends of laterally spaced masts 19 each of which carries an equalizer assembly 20 around which a boom hoist line 21 runs. Another equalizer assembly 22 is carried by the upper end of a pair of pivotally mounted gantry members 23 which are raised and held in position by a back hitch assembly in the form of a pair of hydraulic cylinders 24 (only one being shown). It will be seen that each of the boom hoist lines 21 forms a three-part line between the equalizer assemblies 20, 22 and the other end of each line is wound on one drum 25 of a dual drum boom hoist 26 at the rear end of the upper works 13.

To prevent overcentering of the boom 17 when it is raised, the upper works 13 carries automatic, cushioned boom stops 28. Both the boom 17 and the boom stops 28 may be removed from the upper works 13 when it is desired to move the crane 10 to another job site. In the illustrated embodiment, the crane 10 is equipped with two lift lines 30 and 31. The front lift line 30 is wound on a drum 32 and extends over a sheave 33 on the rear side of the boom 17 and then makes a double reach between upper and lower equalizer assemblies 34, 35, respectively, carried by the boom and a main hook assembly 36. The rear lift line 31 is wound on another drum 37 and extends over another sheave 33 and then over an upper pulley assembly 38 mounted on the end of a boom extension 39. It will be also understood that the upper works carries a suitable power source, such as a diesel engine (not shown) and appropriate variable control power transmission means for the major functions of the machine. The crane 10 is also provided with an operator's cab 40 within which the controls for the crane functions are located.

In accordance with one aspect of the present invention, the rotatable bed 15 is formed of a large, integral weldment having a horizontal web portion 41 with a reinforced vertical shaft opening 42 adapted to be aligned with and receive a pivot post **42*a* located on the axis of the ring gear and roller path 16. Integral with the web portion 41 are a pair of yoke-shaped side frames 43 having an arch portion 44 located aft of the pivot post 42*a*. Depending from each arch portion 44 is an integral jaw member 45,** the jaws of which are disposed to straddle the ring gear and roller path.

Inboard of each jaw member 45, is a large rear load bearing roller 45 journalled on a shaft 47, the ends of which are machined flat to support the rotatable bed 15 in load bearing relation. Each end of the shaft 47 is also apertured 48 to receive a locating and retaining bolt 49. It will be understood, of course, that the rollers 46 engage the uppersurface of the ring gear and roller path 16.

Figure 4:
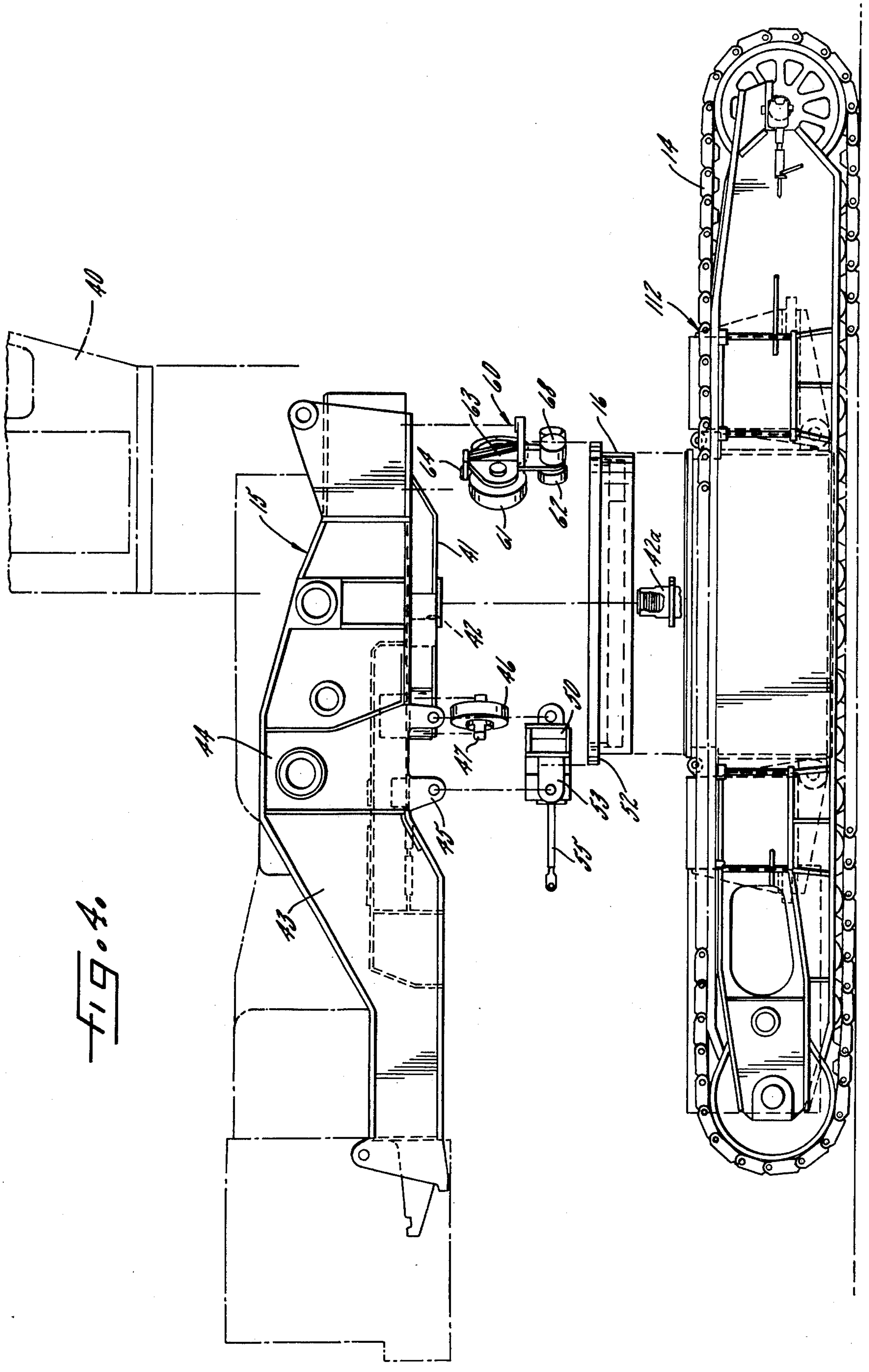
FIG. 4 is an enlarged, fragmentary side elevation of the rotatable bed and lower works of the crane in exploded view.
Figure 6:
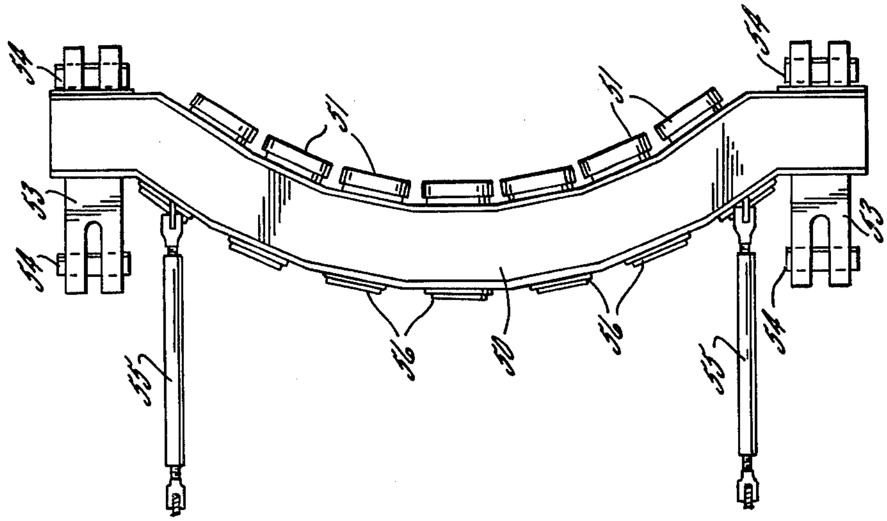
FIG. 6 is an enlarged plan view of the rear hook roller assembly.
Figure 5:
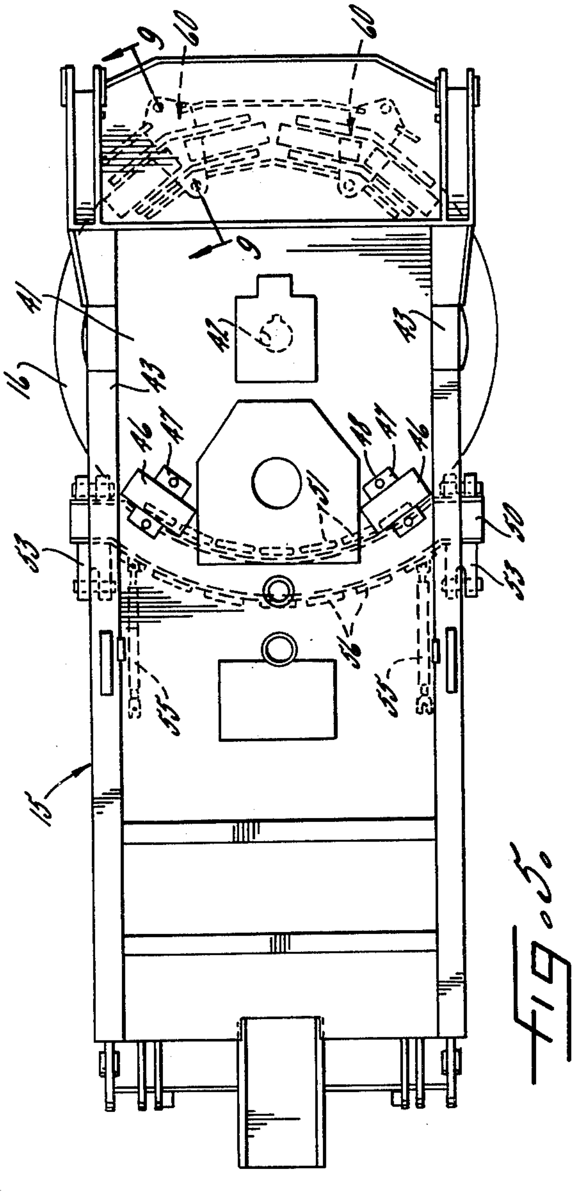
FIG. 5 is a section taken substantially along line 5—5 in FIG. 4.
Figure 8:
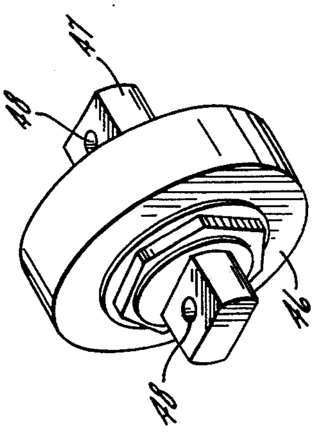
FIG. 8 is an enlarged perspective view of one of the rear load rollers.

Pursuant to another feature of the present invention an arcuate beam 50 is detachably connected to the jaw members 45 for journalling a plurality of rear hook rollers 51 adapted to roll on the underside of a horizontal flange 52 on the roller path 16. As shown in FIGS. 4, 5 and 6, each end of the arcuate beam 50 is slidably carried on a double bifurcated 53 link which spans one of the jaw members 45 and is pinned thereto by pins 54. To slide the beam 50 fore and aft on the links 52, a turnbuckle assembly 55 is provided adjacent each end of the beam and anchored to a portion of the rotatable bed 15. When it is desired to remove the upper works 13 from the lower works 12, the turnbuckle assemblies 55 may be shortened by operation of a suitable ratchet assembly (not shown) to slide the beam 50 rearward and thus pull the hook rollers 51 out from under the flange 52. In the illustrated embodiment the beam 50 carries seven hook rollers 51 each of which is journalled by bearings (not shown) eccentrically mounted in respective housings 56. By rotating and then locking the eccentric mountings, each of the hook rollers 51 may be precisely adjusted to roll evenly on the underside of the flange 52.

Figure 7:
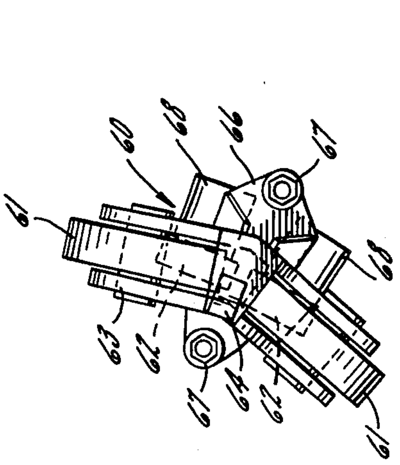
FIG. 7 is an enlarged plan view of the front roller assembly.
Figure 9:
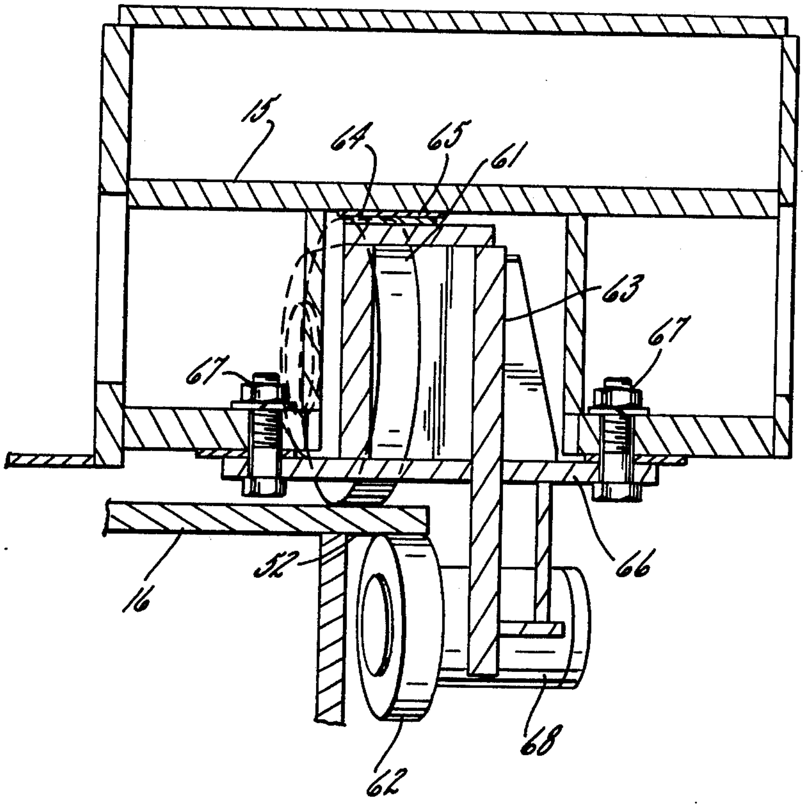
FIG. 9 is an enlarged fragmentary section taken substantially along line 9—9 in FIG. 5.

In keeping with another aspect of the invention, the rotatable bed 15 is provided with a pair of front roller assemblies 60 each including two load rollers 61 and two hook rollers 62 journalled on a common sub-frame or roll carrier 63. As shown in FIGS. 7 and 9, each carrier 63 includes a top load pad 64 disposed on a line which bisects the center of each of the load rollers 62 and on which a pad 65 secured to the rotating bed 15 rests. Each roll carrier 63 is also provided with a horizontal web 66 apertured to receive bolts 67 for locating and securing the carrier to the rotating bed. As illustrated in FIG. 9, the load rollers 61 run on the upper surface of the roll path 16 and the hook rollers 62 engage the under surface of the flange 52. In the preferred embodiment, the front hook rollers 62, like the rear hook rollers 51 are journalled by bearings (not shown) eccentrically mounted in housings 68 secured to the roll carrier 63. By rotating and then locking each of the eccentric mountings, the hook rollers 62 may be precisely adjusted to roll evenly on the underside of the flange 52.

We claim as our invention:

1. A rotatable bed and roller assembly for a load handling device having a base with a ring gear and roller path thereon comprising, in combination, a weldment having a horizontal web portion with a vertical shaft opening adapted to be aligned with the axis of said ring gear and side frames extending fore and aft of said axis, an integral jaw member depending from each side frame aft of said axis, means including an arcuate beam detachably connected to said jaw members for journalling a plurality of rear hook rollers adapted to roll on the underside of a horizontal flange on said roller path and front and rear roller assemblies for rotatably supporting said weldment on said roller path, the ends of said arcuate beam each being slidably carried on a link spanning each of said jaw members, and means for adjusting said arcuate beam fore and aft so as to position said hook rollers with respect to said flange.

2. A rotatable bed as defined in claim 1 wherein said adjusting means includes a turnbuckle connected adjacent each end of said arcuate beam and an aft point on said side frame.

3. A rotatable bed and roller path as defined in claim 1 wherein each of side frames is generally yoke-shaped with the arch portions thereof located aft of said axis and with said respective jaw members depending from said arch portions and disposed to straddle said ring gear and roller path.

4. A rotatable bed and roller path as defined in claim 1 wherein said rear roller assemblies include a large rear load bearing roller journalled on a shaft carried by said weldment inboard each of said jaw members.

5. A rotatable bed and roller path as defined in claim 4 wherein the ends of said shaft are machined flat to support said rotatable bed in load bearing relation and said shaft ends are apertured to receive a locating and retaining bolt.

* * * * *